United States Patent
Watanabe et al.

(10) Patent No.: US 6,528,113 B1
(45) Date of Patent: Mar. 4, 2003

(54) PROCESS FOR PRODUCING AN ADHESIVE-TREATED POLYESTER FIBER CORD

(75) Inventors: Hirosuke Watanabe, Ibaraki (JP); Shoji Makino, Matsuyama (JP); Toshimasa Kuroda, Takatsuki (JP)

(73) Assignee: Teijin Limited, Osaka (JP)

(*) Notice: Subject to any disclaimer, the term of this patent is extended or adjusted under 35 U.S.C. 154(b) by 0 days.

(21) Appl. No.: 09/806,053

(22) PCT Filed: Aug. 21, 2000

(86) PCT No.: PCT/JP00/05593

§ 371 (c)(1), (2), (4) Date: Mar. 27, 2001

(87) PCT Pub. No.: WO01/14461

PCT Pub. Date: Jan. 3, 2001

(30) Foreign Application Priority Data

Aug. 23, 1999 (JP) .......... 11-235356
Sep. 1, 1999 (JP) .......... 11-247251

(51) Int. Cl.$^7$ .......... B05D 5/10
(52) U.S. Cl. .......... 427/207.1; 427/175; 427/386; 427/407.1; 427/413; 156/175
(58) Field of Search .......... 427/171, 175, 427/207.1, 208.2, 331, 372.2, 384, 385.5, 386, 393.5, 402; 156/175

(56) References Cited

U.S. PATENT DOCUMENTS 3,307,966 A  3/1967  Shoaf
5,624,765 A * 4/1997  Toukairin et al. .......... 428/460

FOREIGN PATENT DOCUMENTS

| EP | 0 892 007 A2 | 1/1999 | .......... C08J/5/06 |
| GB | 1056798 | 10/1963 | |
| JP | 57-187238 | 11/1982 | .......... B29H/9/02 |
| JP | 60-110980 | 6/1985 | .......... D06M/15/693 |
| JP | 8-2971 | 1/1996 | .......... C08J/5/06 |

OTHER PUBLICATIONS

International Search Report.
Patent Abstracts of Japan, vol. 1998, No. 10, Aug. 31, 1998 for JP 10 121379 A.

* cited by examiner

*Primary Examiner*—Michael Barr
*Assistant Examiner*—Rebecca A. Blanton
(74) *Attorney, Agent, or Firm*—Sughrue Mion, PLLC

(57) ABSTRACT

An adhesive-treated polyester fiber cord having a high adhesion to non-vulcanized rubber, a high resistance to separation of fibers or filaments from each other, and being useful as a reinforcing cord for producing a rubber composite material such as belt having high dimensional stability and power transmission property, is produced by first impregnating a material cord a first adhesive liquid containing a polyepoxide compound and a blocked polyisocyanate compound in solid weight ratio of 1/3–1/15, by heat treating it at 160–240° C., by second treating the treated cord with a second adhesive liquid containing a resorcinol-formaldehyde resin and a rubber latex in a solid weight ratio of 1/3–1/15, by heat treating it at 180–240° C., by third treating the treated cord with a third adhesive liquid containing a resorcinol formaldehyde resin (resorcinol/formaldehyde molar ratio: 1/0.6–1/1.0) and a rubber component (including natural rubber in a content of at least 15% by weight and optionally vinyl pyridine-styrene-butadiene copolymer rubber) in a weight ratio of 1/10–1/20 and by heat treating at 140–170° C.

14 Claims, No Drawings

PROCESS FOR PRODUCING AN ADHESIVE-TREATED POLYESTER FIBER CORD

TECHNICAL FIELD

The present invention relates to a process for producing an adhesive-treated polyester fiber cord useful as a reinforcing cord for a power-transmission belt. More particularly, the present invention relates to a process for producing an adhesive-treated polyester fiber cord which is suitable as a core cord of a lapped V belt and has an excellent handling property in a belt-forming procedure, an excellent adhesion to non-vulcanized rubber used in a belt-forming procedure, and a superior bonding property to a matrix rubber after vulcanization of the rubber, and exhibits an excellent adhesive durability to such an extent that even when the cord is brought into contact with water vapor during the vulcanizing procedure, the adhesive property of the cord is not degraded, and a superior belt-forming property.

BACKGROUND ART

A polyester fiber cord generally has excellent mechanical strength, modulus of elasticity, dimensional stability and heat resistance, and thus is useful as an excellent reinforcing cord for rubber-composite materials, for example, tires, belts and hoses which are employed under severe conditions, and thus the use of the polyester fiber cord is expected to increase.

Generally, the reinforcing fibers for rubber-composite materials, for example, belts, are employed in the form of a twisted yarn cord. The important properties for the cord are a high adhesive property of the cord to matrix rubber, a high mechanical strength of cord, a good balance between elongation under load and dry heat shrinkage of the cord, an appropriate heat shrinkage stress, and a superior adhesion of the cord to the non-vulcanized rubber in a forming procedure. For example, in the case of a belt, among the above-mentioned properties, the adhesive property and the mechanical strength of the cord significantly contribute to enhancing the load resistance and durability of the resultant belt, and the balance between the elongation under load and the dry heat shrinkage influences the dimensional change, (for example, the length) of the belt during movement of the belt, and closely relates to a power transmission efficiency of the belt. Further, the adhesion of the belt to the non-vulcanized rubber in a belt-forming procedure is a property special to the belt-forming procedure and closely relates to peeling or separation of the cord from the non-vulcanized rubber subjected to the belt-forming procedure and directly influences the yield of the product. Therefore, an adhesion process technology which enables the resultant product to exhibit well balanced properties, as mentioned above, is desired.

With respect to an adhesion of a polyester fiber cord with a rubber matrix, various types of resorcinol-formaldehyde latex adhesives ($RF_r$ adhesives) are provided by, for example, Japanese Unexamined Patent Publications No. 57-187,238 and No. 60-110,980 and Japanese Examined Patent Publication No. 8-2,971. When these adhesives are employed, the adhesion performance of the polyester fiber cord as a reinforcing fiber cord for power transmission belt is certainly sufficient, but the adhesives are disadvantageous in that the adhesion of the cord with the non-vulcanized rubber in the belt-forming procedure is insufficient and peeling or separation of the cord from the rubber matrix frequently occurs. Therefore, in the present stage, the close adhesion of the cord with the non-vulcanized rubber in the belt-forming procedure is ensured by coating a rubber adhesive prepared by dissolving an adhesive rubber in a solvent and in a small amount, on a periphery of a cord coated with an $RF_r$ adhesive.

However, the above-mentioned rubber adhesive causes the working environment for the belt-forming procedure to be bad and sticking of the non-dried rubber adhesive to a worker's body is unhealthy. Also, the treatment with the solvent-containing rubber adhesive is disadvantageous in that the waste liquid-treatment cost is high and the working environment is bad, in comparison with the aqueous treatment.

DISCLOSURE OF THE INVENTION

The present invention was made, against the above-mentioned background, to provide a process for producing an adhesive-treated polyester fiber cord having excellent handling property and adhesion of the cord to non-vulcanized vulcanized rubber in a forming procedure, and a superior bonding property of the cord with a matrix rubber, and useful for rubber composite materials, particularly a power-transmission belt, having a high durability.

The process for producing an adhesive-treated polyester fiber cord of the present invention comprises:

subjecting a non-twisted or twisted polyester fiber cord to a first adhesive-treating procedure in which a first adhesive liquid comprising a polyepoxide compound and a blocked polyisocyanate compound in a solid weight ratio of 1/3 to 1/5 is applied to the polyester fiber cord and the first adhesive liquid-applied polyester fiber cord is heat treated at a temperature of 160 to 240° C.;

twisting, where the polyester fiber cord has no twist, the non-twisted polyester fiber cord;

subjecting the first adhesive-treated polyester fiber cord to a second adhesive-treating procedure in which a second adhesive liquid comprising a resorcinol-formaldehyde condensation product resin and a rubber latex in an effective component weight ratio of 1/3 to 1/15, is applied to the first adhesive-treated polyester fiber cord, and the second adhesive liquid-applied polyester fiber cord is heat-treated at a temperature of 180 to 240°C.; and subjecting the second adhesive-treated polyester fiber cord to a third adhesive-treating procedure in which a third adhesive liquid comprising an aqueous dispersion of a resorcinol-formaldehyde condensation product component (RF) in a molar ratio (R/F) of resorcinol (R) to formaldehyde (F) of 1/0.6 to 1/1.0 and a rubber component (G) containing natural rubber (NR) in a content of at least 15% by weight based on the total weight of the rubber component (G), in a solid weight ratio (RF/G) of the resorcinol-formaldehyde condensation product component (RF) to the rubber component (G) of 1/10 to 1/20 is applied to the second adhesive-treated polyester fiber cord, and the third adhesive liquid-applied polyester fiber cord is heat-treated at a temperature of 140 to 170° C.

In the process for producing an adhesive-treated polyester fiber cord of the present invention, preferably, the polyester fibers in the polyester fiber cord are fibers treated with an epoxy compound during a fiber-forming procedure.

In the process for producing an adhesive-treated polyester fiber cord of the present invention, the polyepoxide compound contained in the first adhesive liquid is preferably selected from glycidyl ether compounds of polyhydric alcohol compounds.

In the process for producing an adhesive-treated polyester fiber cord of the present invention, the polyepoxide compound in the first adhesive liquid preferably has an epoxy group content of 0.2 equivalent or more per 100 g of the polyepoxide compound.

In the process for producing an adhesive-treated polyester fiber cord of the present invention, the blocked polyisocyanate compound is preferably selected from addition reaction products of a polyisocyanate compound with a blocking agent comprising at least one member selected from oxime compounds, phenol compounds and caprolactam.

In the process for producing an adhesive-treated polyester fiber cord of the present invention, the first adhesive-treated polyester fiber cord preferably has the first adhesive in a total solid weight of 0.5 to 1.5% by weight based on the polyester fiber cord.

In the process for producing an adhesive-treated polyester fiber cord of the present invention, the heat treatment for the first adhesive liquid-applied polyester fiber cord is preferably carried out under a stretched condition under which the first adhesive liquid-applied polyester fiber cord is elongated at an elongation of 2.0 to 4.5%.

In the process for producing an adhesive-treated polyester fiber cord of the present invention, the rubber latex contained in the second adhesive liquid preferably comprises, as a main rubber component, a vinylpyridine-styrene-butadiene copolymer rubber.

In the process for producing an adhesive-treated polyester fiber cord of the present invention, the second adhesive liquid optionally further comprises a blocked isocyanate compound in a weight ratio of 1/10 to 1/3 to the solid weight of the rubber latex contained in the second adhesive liquid.

In the process for producing an adhesive-treated polyester fiber cord of the present invention, the second adhesive-treated polyester fiber cord preferably has the second adhesive in a total solid weight of 2.0 to 3.0% based on the weight of the polyester fiber cord.

In the process for producing an adhesive-treated polyester fiber cord of the present invention, the heat treatment for the second adhesive liquid-applied polyester fiber cord is preferably carried out under a relaxed condition under which the second adhesive liquid-applied polyester fiber cord is allowed to shrink at a shrinkage of 0.5 to 1.5%.

In the process for producing an adhesive-treated polyester fiber cord of the present invention, the rubber component (G) contained in the third adhesive liquid preferably comprises natural rubber (NR) and a vinylpyridine-styrene-butadiene copolymer rubber (VpR) in a solid weight ratio (NR/VpR) of 2/8 to 4/6.

In the process for producing an adhesive-treated polyester fiber cord of the present invention, the third adhesive liquid optionally further comprises an aqueous dispersion of carbon black (C) in an effective component weight ratio (C/(RF+G)) of the carbon black (C) to the total of the resorcinol-formaldehyde condensation product component (RF) and the rubber component (G) of 1/3 to 1/10.

In the process for producing an adhesive-treated polyester fiber cord of the present invention, the third adhesive-treated polyester fiber cord preferably has the third adhesive in a total solid weight of 0.5 to 1.5% based on the weight of the polyester fiber cord.

BEST MODE OF CARRYING OUT THE INVENTION

The polyester fibers usable for the adhesive-treated polyester fiber cord of the present invention are preferably formed from a polyester having repeating units substantially consisting of ethylene terephthalate groups. The polyester fibers usable for the present invention may be formed from polyesters other than the polyethylene terephthalate, for example copolyesters of polyethylene terephthalate with a small amount of a third component, for example, isophthalic acid, 5-sodium sulfoisophthalic acid, adipic acid, tetramethylene glycol and diethylene glycol. The polyester fibers usable for the present invention include epoxy-pretreated polyester fibers prepared by treating polyester fibers with an epoxy compound.

In the process of the present invention, a non-twisted or twisted polyester fiber cord is subjected to the first, second and third adhesion procedures which will be explained in detail hereinafter. The twisted and non-twisted polyester fiber cord may be prepared by a conventional cord-forming method. For example, in the preparation of a twisted polyester fiber cord, a desired number of polyester fiber yarns are set parallel to each other, the parallel yarn bundle is first-twisted with a desired first twist number, a desired number of the first-twisted yarns are set parallel to each other and subjected to a final twisting with a desired final twist number, to form a twisted polyester fiber cord (a material cord). The first twist number is usually smaller than the final twist number, and the twisting direction of the first twist is opposite to that of the final twist.

In the process of the present invention, the twisted or non-twisted polyester cord (material cord) is subjected to a first adhesive-treating procedure with a first adhesive liquid. The first adhesive liquid for the first adhesion procedure comprises a polyepoxide compound ($E_p$) and a blocked polyisocyanate compound ($I_{so}$) in a solid weight ratio ($E_p/I_{so}$) of 1/3 to 1/5. The polyepoxide compound ($E_p$) preferably has two or more epoxy groups per molecule. The first adhesive liquid is in the state of an aqueous dispersion of the polyepoxide compound ($E_p$) and the blocked polyisocyanate compound ($I_{so}$). If the solid weight ratio ($E_p/I_{so}$) falls outside of the above-mentioned range, the resultant adhesive-treated polyester fiber cord exhibits an unsatisfactory adhesive property and an insufficient resistance to fatigue, namely durability.

The polyepoxide compound ($E_p$) usable for the first adhesion procedure preferably has a epoxy group content of 0.2 equivalent or more per 100 g of the polyepoxide compound ($E_p$). Also, the polyepoxide compound ($E_p$) is preferably selected from polyglycidyl ether compounds of polyhydric aliphatic alcohol compounds, which exhibit an excellent performance for the first adhesion procedure. The polyepoxide compound is usually employed in the form of an aqueous solution, emulsion or dispersion. The aqueous emulsion is prepared by dissolving the polyepoxide compound ($E_p$) in a small amount of a solvent, and emulsifying the polyepoxide compound solution in water by using a conventional emulsifying agent, for example, sodium alkylbenzenesulfonate or sodium dioctylsulfosuccinate. When the polyepoxide compound ($E_p$) is soluble in water, an aqueous solution thereof is employed. The polyepoxide compound ($E_p$) may be used together with a curing reaction catalyst, for example, an amine compound or imidazol compound.

The blocked polyisocyante compound ($I_{so}$) for the first adhesive-treating procedure is preferably selected from addition reaction products of a polyisocyanate compound, for example, diphenyl-methanediisocyanate or tolylenediisocyanate with a blocking agent comprising at least one member selected from oxime compounds, phenol compounds and caprolactam.

The blocked polyisocyanate compound ($I_{so}$) is usually in the form of fine solid particles and is employed in the state of an aqueous dispersion prepared by using a dispersing agent, for example, sodium dioctylsulfosuccinate.

The first adhesive liquid for the process of the present invention may contain an optional component other than the polyepoxide compound ($E_p$) and the blocked polyisocyanate compound unless the optional component hinders the purpose of the present invention. However, the first adhesive liquid is preferably free from rubber latex.

In the first adhesive-treating procedure, the amount of the first adhesive liquid adhered on the polyester fiber cord is preferably 0.5 to 1.5%, more preferably 0.8 to 1.4%, by weight, in terms of dry solid weight, based on the weight of the polyester fiber cord. If the adhesion amount of the first adhesive liquid falls outside of the above-mentioned range, the resultant adhesive-treated polyester fiber cord may exhibit an unsatisfactory adhesive property and a poor resistance to fatigue.

There is no limitation to the method of applying the first adhesive liquid to the polyester fiber cord. Usually, an immersion method is applied. The first adhesive liquid is adhered to the polyester fiber cord by the immersion method and, preferably, the first adhesive liquid-applied polyester fiber cord is dried at a temperature of 130 to 160° C. for 60 to 150 seconds and then heat-treated at a temperature of 160 to 240° C., more preferably 210 to 235° C. for 60 to 180 seconds, more preferably 90 to 150 seconds. The drying and heat-treating procedure is preferably carried out under a stretched condition under which the first adhesive liquid applied polyester fiber cord is elongated at an elongation of 2.0 to 4.5%, more preferably 3.0 to 4.0%, still more preferably about 3.5%, to enhance the mechanical strength of the cord.

When the cord has no twist, the non-twisted, first adhesive-treated polyester fiber cord is twisted in the similar manner to that mentioned above.

The first adhesive-treated polyester fiber cord is subjected to a second adhesive-treating procedure in which a second adhesive liquid comprising a resorcinol-formaldehyde condensation product resin ($RF_r$) and a rubber latex (L) in an effective component weight ratio ($RF_r/L$) of 1/3 to 1/15, preferably 1/5 to 1/12, is applied to the first adhesive-treated polyester fiber cord, and the second adhesive liquid-applied polyester fiber cord is heat-treated at a temperature of 180 to 240°C. A mixture of the resorcinol-formaldehyde condensation product resin ($RF_r$) with the rubber latex (L) is referred to as an RFL adhesive, hereinafter. The RFL adhesive may be selected from conventional RFL adhesives for rubber material treatments. Preferably, in the RFL adhesive, the molar ratio of resorcinol to formaldehyde is 1/0.1 to 1/6, more preferably 1/0.5 to 1/4. When the effective component weight ratio ($RF_r/L$) is less than 1/15, the resultant second adhesive liquid exhibits an insufficient agglomerating force and thus an unsatisfactory adhesive performance. If the ratio ($RF_r/L$) is more than 1/3, the resultant adhesive-treated polyester fiber cord exhibits too high a stiffness and an unsatisfactory mechanical strength and an insufficient fatigue resistance.

There is no limitation to the type of the rubber latex (L). Usually, vinyl pyridine-styrene-butadiene copolymer latices are preferably employed as a main rubber component of the rubber latex (L). The second adhesive liquid optionally comprises, as a cross-linking agent, a blocked polyisocyanate compound, for example, a blocking product of dipheylmethanediisocyanate with caprolactam, in a solid weight ratio of 1/10 to 1/3, more preferably about 1/5, to the solid weight of the rubber latex (L). The blocked polyisocyanate compound contributes to enhancing the adhesive performance of the resultant adhesive-treated polyester fiber cord.

The method of applying the second adhesive liquid is not limited to a specific method. Usually, an immersion method is employed. Preferably, the dry amount of the effective components of the second adhesive liquid applied to the first adhesive-treated polyester fiber cord is controlled to 2.0 to 3.0% by weight, more preferably 2.2 to 2.8% by weight, based on the weight of the polyester fiber cord.

The second adhesive liquid applied cord is preferably dried at a temperature of 150 to 180° C. for 90 to 150 seconds under such a condition that the cord is not slackened, and then heat-treated at a temperature of 180 to 240° C., more preferably 210 to 240° C. for 60 to 180 seconds, more preferably 90 to 150 seconds. The heat treatment for the second adhesive liquid-applied polyester fiber cord is preferably carried out under a relaxed condition such that the cord is allowed to shrink at a shrinkage of 0.5 to 1.5, more preferably about 1.0%.

In an embodiment of the process of the present invention, the second adhesive-treated polyester fiber cord is subjected to a third adhesive-treating procedure in which a third adhesive liquid comprising an aqueous dispersion of a resorcinol-formaldehyde condensation product component (RF) in a molar ratio (R/F) of resorcinol (R) to formaldehyde (F) of 1/0.6 to 1/1.0 and a rubber component (G) containing at least natural rubber (NR) in a content of at least 15% by weight based on the total weight of the rubber component (G), in a solid weight ratio (RF/G) of the resorcinol-formaldehyde condensation product component (RF) to the rubber component (G) of 1/10 to 1/20, is applied to the second adhesive-treated polyester fiber cord, and the third adhesive liquid-applied polyester fiber cord is heat-treated at a temperature of 140 to 170° C.

In third adhesive liquid, the molar ratio (R/F) of resorcinol (R) to formaldehyde (F) of the resorcinol-formaldehyde condensation product component (RF) is controlled to 1/0.6 to 1/1, preferably 1/0.7 to 1/0.9, for the purpose of allowing the resultant third adhesive coating on the cord to be slightly three-dimensionally cross-linked to enhance the adhesive property of the cord itself and to improve the adhesion of the resultant cord to a non-vulcanized rubber in a product forming procedure without reducing the bonding property of the third adhesive coating.

For the same purpose as mentioned above, the solid weight ratio (RF/G) of the resorcinol-formaldehyde condensation product component (RF) to the rubber component (G) is controlled to 1/10 to 1/20, preferably 1/12 to 1/18. The resorcinol-formaldehyde condensation product component (RF) and the rubber component (G) are employed in the state of an aqueous dispersion. The rubber component (G) comprises at least natural rubber (NR). When an aqueous dispersion of the rubber component (G) or the natural rubber (NR), is used, preferably, the aqueous dispersion is prepared by dispersing the rubber component in water without using a dispersing agent. Even when the dispersing agent is used, the content of the dispersing agent is preferably restricted to less than 5% by weight, based on the dry weight of the natural rubber.

There is no limitation to the method of applying the third adhesive liquid to the second adhesive-applied polyester fiber cord. Usually an immersion method is utilized. The amount of the effective components of the third adhesive liquid applied to the cord is preferably controlled to 0.5 to 1.5%, more preferably 0.8 to 1.3% by dry solid weight, based on the dry weight of the polyester fiber cord.

In the process of the present invention, the third adhesive liquid-applied polyester fiber cord must be heat-treated at a temperature lower than the heat treatment temperatures for the first adhesive liquid-applied cord and the second adhesive liquid-applied cord, namely, of 140 to 170° C., preferably 145 to 165° C., for 120 to 240 seconds, preferably 150 to 200 seconds, to semi-cure the third adhesive coating on the cord. This heat treatment contributes to enhancing the adhesion of the resultant third adhesive coating to the non-vulcanized rubber and to preventing the separation of the cord when the cord is employed to form a rubber composite product, for example, a belt. Also, the third adhesive coating exhibits excellent compatibility with both the second adhesive coating formed from the second adhesive liquid and the matrix rubber used for the rubber composite product, and can be sufficiently cross-linked and cured by the vulcanizing procedure for the rubber composite product, for example, a belt, and thus the resultant cord can exhibit an excellent adhesive performance. Further, even when the adhesive-treated polyester fiber cord produced by the process of the present invention is undesirably exposed to water vapor, no reduction in adhesive performance occurs.

The third adhesive liquid optionally contains an aqueous dispersion of carbon black (C) produced by a conventional method, in an effective component weight ratio (C/(RF+G)) of the carbon black (C) to the total of the resorcinol-formaldehyde condensation product component (RF) and the rubber component (G) of 1/3 to 1/10, preferably 1/4 to 1/8. The carbon black (C) added to the third adhesive liquid covers the peripheral surface of the resultant adhesive-treated polyester fiber cord and contributes to enhancing the resistance of the cord to ultraviolet rays, and to preventing a reduction in the adhesive performance of the cord.

In another embodiment of the process of the present invention, the third adhesion procedure for the second adhesive-treated polyester fiber cord is carried out by using a third adhesive liquid comprising an aqueous dispersion of a resorcinol-formaldehyde condensation product component (RF) in a molar ratio (R/F) of resorcinol (R) to formaldehyde (F) of 1/0.6 to 1/1.0 and a rubber component (G) containing natural rubber (NR) and a vinylpyridine-styrene-butadiene copolymer rubber (VpR) in a solid weight ratio (NR/VpR) of 2/8 to 4/6, in a solid weight ratio (RF/G) of the resorcinol-formaldehyde condensation product component (RF) to the rubber component (G) of 1/10 to 1/20, and the third adhesive liquid-applied polyester fiber cord is heat-treated at a temperature of 140 to 170° C.

In the rubber component (G) for the third adhesive liquid, the natural rubber (NR) and the vinyl pyridine-styrene-butadiene copolymer rubber (VpR) are mixed with each other in a solid weight ratio (NR/VpR) of 2/8 to 4/6, preferably 3/7 to 7/13. When the ratio (NR/VpR) is more than 2/8, while the adhesion of the resultant adhesive-treated cord to the non-vulcanized rubber is enhanced, the resultant cord exhibits too high a stickiness to other cords and thus the handling property of the cords is degraded. When the ratio (NR/VpR) is less than 4/6, the adhesion of the resultant cord to the non-vulcanized rubber is reduced.

In the resorcinol-formaldehyde condensation product component (RF) for the third adhesive liquid, the molar ratio (R/F) of resorcinol (R) to formaldehyde (F) is 1/0.6 to 1/1.0, preferably 1/0.7 to 1/0.9.

The specific molar ratio (R/F) as mentioned above contributes to enabling the resultant third adhesive coating to be slightly three-dimensionally cross-linked with the resorcinol-formaldehyde condensation product component (RF), and to enhancing the adhesive property of the resultant cord so as to increase the adhesion of the resultant cord to the non-vulcanized rubber in the forming procedure without decreasing the bonding property of the third adhesive coating. For the same purpose as mentioned above, the solid weight ratio (RF/G) of the resorcinol-formaldehyde condensation product component (RF) to the rubber component (G) comprising the natural rubber (N/R) and the vinyl pyridine-styrene-butadiene copolymer rubber (vpR) is controlled to 1/10 to 1/20, preferably 1/12 to 1/18. The aqueous dispersion of the natural rubber (NR) is preferably prepared by not using a surface active agent. Even when the surface active agent is used, the content of the surface active agent should be restricted to less than 5% by weight based on the dry weight of the natural rubber.

There is no limitation to the method of applying the third adhesive liquid to the second adhesive-applied polyester fiber cord. Usually an immersion method is utilized. The amount of the effective components of the third adhesive liquid applied to the cord is preferably controlled to 0.5 to 1.5%, more preferably 0.6 to 1.3% by dry solid weight, based on the dry weight of the polyester fiber cord.

In the embodiment of the process of the present invention, the third adhesive liquid-applied polyester fiber cord must be heat-treated at a temperature lower than the heat treatment temperatures for the first adhesive liquid-applied cord and the second adhesive liquid-applied cord, namely, of 140 to 170° C., preferably 150 to 165° C., for 120 to 240 seconds, preferably 150 to 200 seconds, to semi-cure the third adhesive coating on the cord. This heat treatment contributes to enhancing the adhesion of the resultant third adhesive coating to the non-vulcanized rubber and to preventing the separation of the cord when the cord is employed to form a rubber composite product, for example, a belt. Also, the third adhesive coating exhibits excellent compatibility with both the second adhesive coating formed from the second adhesive liquid and the matrix rubber used for the rubber composite product, and can be sufficiently cross-linked and cured by the vulcanizing procedure for the rubber composite product, for example, a belt, and thus the resultant cord can exhibit an excellent adhesive performance. Further, even when the adhesive-treated polyester fiber cord produced by the process of the present invention is undesirably exposed to water vapor, no reduction in adhesive performance occurs.

EXAMPLES

The present invention will be further illustrated by the following examples.

In the examples and comparative examples, the cord tensile strength, cord peeling strength from non-vulcanized rubber, and cord peeling strength from vulcanized rubber were determined by the following measurements.

(1) Tensile Strength of Cord

The tensile strength of cord was measured by using a tensile tester (model Instron 5-565, made by Instron Co.) having 4D air chucks, at a cord specimen length of 250 mm at a tensile rate of 100 mm/min. The measurement was repeated ten times, and an average of the resultant data was calculated. The tensile strength of the specimen was represented by the average tensile strength.

(2) Peeling Strength Between Cord and Non-Vulcanized Rubber

Five specimens of cord were placed on a stainless steel plate base and covered by a non-vulcanized rubber sheet having a thickness of 2 mm and further by a stainless steel plate. A pressure of 196 kPa (2 kgf/cm$^2$) was applied onto the stainless steel plate surface for 10 seconds by using a cold press, to press the rubber sheet toward the cord specimens. Then, the five cord specimens were separated from the non-vulcanized rubber sheet at a separating rate of 200 mm/min, and the force necessary to separate the specimens was measured and represented in units of N/5 cords.

(3) Peeling Strength Between Cord and Vulcanized Rubber

A peeling strength of an adhesive-treated cord from a rubber matrix was measured. Seven specimans of the cord were embedded into a surface portion of a non-vulcanized rubber sheet, and the cord specimen-embedded non-vulcanized rubber sheet was vulcanized under a press pressure of 4,903 kPa (50 kgf/cm$^2$) at a temperature of 150° C. for 20 minutes. Then, two cord specimens located in both the end sides were removed, three specimens located in both the end sides and in the center of the remaining five specimens were simultaneously peeled off from the rubber sheet at a peeling rate of 200 mm/minutes, and the force needed to peel off the three cord specimens was measured and represented in units of N/3 cords.

Also, a specimen of the same cord specimen-embedded, vulcanized rubber sheet as mentioned above was left in a water vapor atmosphere at a temperature of 150° C. for 60 minutes. The water vapor-exposed specimen was subjected to the same peeling strength measurement as mentioned above, to determine the peeling strength of the adhesive-treated cord from rubber matrix after exposure to water vapor.

(4) Handling Property of Cord

After the adhesive treatment for the cord was completed and the resultant adhesive-treated cord was wound around a bobbin, the cord was unwound from the bobbin. When the efficiency of the unwinding operation was decreased due to adhesion between the wound cord portions, the handling property of the cord was evaluated bad and represented by class 1. When the unwinding operation could be carried out without difficulty, the handling property of the cord was evaluated good and represented by class 2.

Example 1

First, second and third adhesive liquids were prepared as follow.

First Adhesive Liquid

Sorbitol polyglycidyl ether (trademark: DENACOL EX-611, made by NAGASE KASEIKOGYO K.K., concentration: 100%) in an amount of 9.5 kg was mixed with 8.5 kg of a surfactant consisting of a dialkylsulfosuccinic ester sodium salt (trademark: NEOCOL SW, made by DAIICHI KOGYOSEIYAKU K.K., concentration: 30%), and the resultant mixture was fully agitated to prepare a polyepoxide compound solution. The polyepoxide compound solution was mixed into 982 kg of water and the mixture was agitated at a high agitating rate, to disperse the polyepoxide compound solution in water. Then, 76 kg of an aqueous ε-caprolactam-blocked diphenylmethane-diisocyanate dispersion (trademark: Glylbond IL-6 (made by EMSKEMIE CO., solid concentration: 50%) was gradually mixed with and dispersed in the aqueous polyepoxide compound dispersion. The resultant dispersion was uniformly agitated to provide a first adhesive liquid.

Second Adhesive Liquid

A resorcinol-formaldehyde primary condensation product (trademark: SUMIKANOL 700S, made by SUMITOMO KAGAKU K.K., concentration: 65%, molar ratio (R/F): 1/0.6) in an amount of 19.8 kg was mixed into 154.6 kg of water while the mixture is agitated, then the resultant aqueous solution was mixed with 5.0 kg of an aqueous sodium hydroxide solution having a NaOH content of 10%, 19.9 kg of an ammonia solution having an ammonia content of 28%, and 16.8 kg of an aqueous formaldehyde solution having a formaldehyde content of 37%.

The aqueous mixture was gradually agitated. Then, into the aqueous mixture, 425.5 kg of a vinyl pyridine-styrene-butadiene copolymer rubber latex (trademark: JSR0652, made by NIHON GOSEIGOMU K.K., concentration: 40%) were mixed and then 92.0 kg of a blocked polyisocyante compound (trademark: DM-6011, made by MEISEI KAGAKUKOGYO K.K., concentration: 33%) was added. The resultant mixture was uniformly agitated, and finally aged in room temperature atmosphere for 24 hours. The aged mixture was employed as a second adhesive liquid.

Third Adhesive Liquid

The resorcinol-formaldehyde primary condensation product (SUMIKANOL® 700S) in an amount of 5.9 kg was mixed into 800.9 kg of water while agitating the mixture, and it was further mixed with 125.1 kg of an aqueous natural rubber dispersion prepared from a natural rubber resin liquid from which casein was removed, and which had a rubber content of 60%. The mixture was fully agitated to provide a third adhesive liquid.

Preparation of Material Polyester Fiber Cord

Epoxy compound-pretreated polyester filament yarns prepared by TEIJIN, oiled with an oiling agent containing a polyglycidylether compound in filament-forming procedure and having a yarn count of 1,111 dtex/250 filaments (1000 denier/250 filaments) and an intrinsic viscosity of 0.85 determined in o-chlorophenol at a temperature of 20° C. were employed to provide material polyester fiber cords.

Three epoxy compound-pretreated polyester filament yarns are set parallel with each other and the parallel yarn bundle was first twisted with a first twist number of 15 turns/10 cm in the Z direction. The first twisted yarns were set parallel with each other, and the resultant yarn bundle was final-twisted with a final twist number of 9 turns/10 cm in the S direction. A material polyester fiber cord having a thickness of 10,000 dtex (9000 denier) was obtained. The material cord was impregnated with the first adhesive liquid by an immersion method using a tire cord treatment machine (trademark: COMPUTREATER, made by CA LITZLER CO.), and the first adhesive liquid-applied cord was dried at a temperature of 140° C. for 160 seconds and then heat treated at a temperature of 235° C. for 150 seconds while stretching the cord at an elongation of 3.5%. The amount of the first adhesive impregnated in the cord was 1.0% by solid weight based on the weight of the cord.

The first adhesive-treated polyester fiber cord was immersed in the second adhesive liquid and taken up from the liquid. The pick up of the second adhesive liquid applied on the first adhesive-treated cord was 2.0% by dry solid weight based on the weight of the cord.

The first adhesive liquid applied cord was dried at a temperature of 170° C. for 150 seconds while maintaining the cord non-elongated, and then, the dried cord was heat treated at a temperature of 230° C. for 120 second under a shrink at an shrinkage of 0.5%.

Then, the second adhesive-treated cord was immersed in the third adhesive liquid and taken up from the liquid. The pick up of the third adhesive liquid on the second adhesive-treated cord was 1.5% by dry solid weight based on the weight of the cord.

The third adhesive liquid-applied cord was dried and heat-treated at a temperature of 160° C. for 180 seconds.

A third adhesive-treated polyester cord was obtained in a prepreg condition.

The resultant adhesive-treated cord was subjected to a production of a rubber composite material with natural rubber at a press-vulcanizing temperature of 150° C. for 15 minutes under a pressure of 4,903 kPa (50 kgf/cm²).

The test results are shown in Table 1.

Examples 2 to 4 and Comparative Examples 1 to 5

In each of Examples 2 to 4 and Comparative Examples 1 to 5, an adhesive-treated polyester fiber cord and a rubber composite material containing the cord were produced in accordance with the same procedures as in Example 1, except that in the first adhesive liquid, the solid weight ratio ($E_p/I_{so}$) of the polyepoxide compound ($E_p$) to the blocked polyisocyanate compound ($I_{so}$) was changed to as shown in Table 1; in the second adhesive liquid, the effective component weight ratio ($RF_r/L$) of the resorcinol-formaldehyde condensation product resin ($RF_r$) to the rubber latex (L) was changed to as shown in Table 1; and in the third adhesive liquid, the solid weight ratio (RF/G) of the resorcinol-formaldehyde condensation product component (RF) to the rubber component (G) was changed to as shown in Table 1.

The test results are shown in Table 1.

Second Adhesive Liquid

A resorcinol-formaldehyde primary condensation product (trademark: SUMIKANOL 700S, made by SUMITOMO KAGAKU K.K., concentration: 65%, molar ratio (R/F): 1/0.6) in an amount of 19.8 kg was mixed into 154.6 kg of water while the mixture is agitated, then the resultant aqueous solution was mixed with 5.0 kg of an aqueous sodium hydroxide solution having a NaOH content of 10%, 19.9 kg of an ammonia solution having an ammonia content of 28%, and 16.8 kg of an aqueous formaldehyde solution having a formaldehyde content of 37%.

The aqueous mixture was gradually agitated. Then, into the aqueous mixture, 425.5 kg of a vinyl pyridine-styrene-butadiene copolymer rubber latex (trademark: JSR0652, made by NIHON GOSEIGOMU K.K., concentration: 40% were mixed and then 92.0 kg of a blocked polyisocyante compound (trademark: DM-6011, made by MEISEI KAGAKUKOGYO K.K., concentration: 33%) were mixed. The resultant mixture was uniformly agitated, and finally aged in room temperature atmosphere for 24 hours. The aged mixture was employed as a second adhesive liquid.

Third Adhesive Liquid

The resorcinol-formaldehyde primary condensation product (SUMIKANOL® 700S) in an amount of 5.9 kg was mixed into 800.9 kg of water while agitating the mixture,

TABLE 1

| | Item | | | Cord | | | |
|---|---|---|---|---|---|---|---|
| | | | | | Peeling strength | Peeling strength between cord and vulcanized rubber | |
| | First | Second | Third | | between | | |
| | adhesive liquid Ratio | adhesive liquid Ratio | adhesive liquid Ratio | Tensile strength | cord and non-vulcanized rubber | Before exposing to water vapor | After exposing to water vapor |
| Example No. | ($E_p/I_{so}$) | ($RF_r/L$) | (RF/G) | (N) | (N/5 cords) | (N/3 cords) | (N/3 cords) |
| Comparative 1 | 1/1 | 1/2 | 1/8 | 670 | 3.5 | 250 | 130 |
| Example  2 | 1/2 | 1/5 | 1/10 | 675 | 2.8 | 240 | 120 |
| 3 | 1/3 | 1/1 | 1/12 | 680 | 3.0 | 255 | 115 |
| Example  1 | 1/4 | 1/13 | 1/20 | 680 | 10.2 | 320 | 220 |
| 2 | 1/4 | 1/5 | 1/16 | 685 | 11.2 | 325 | 225 |
| 3 | 1/5 | 1/5 | 1/16 | 680 | 11.6 | 330 | 210 |
| 4 | 1/4 | 1/12 | 1/18 | 675 | 11.2 | 340 | 215 |
| Comparative 4 | 1/5 | 1/16 | 1/18 | 670 | 11.8 | 260 | 150 |
| Example  5 | 1/6 | 1/5 | 1/21 | 675 | 12.8 | 270 | 160 |

Example 5

First, second and third adhesive liquids were prepared as follow.

First Adhesive Liquid

Sorbitol polyglycidyl ether (trademark: DENACOL EX-611, made by NAGASE KASEIKOGYO K.K., concentration: 100%) in an amount of 9.5 kg was mixed with 8.5 kg of a surfactant consisting of a dialkylsulfosuccinic ester sodium salt (trademark: NEOCOL SW, made by DAIICHI KOGYOSEIYAKU K.K., concentration: 30%), and the resultant mixture was fully agitated to prepare a polyepoxide compound solution. The polyepoxide compound solution was mixed into 982 kg of water and the mixture was agitated at a high agitating rate, to disperse the polyepoxide compound solution in water. Then, 76 kg of an aqueous ε-caprolactam-blocked diphenylmethane-diisocyanate dispersion (trademark: Glylbond IL-6 (made by EMSKEMIE CO., solid concentration: 50%) were gradually mixed with and dispersed in the aqueous polyepoxide compound dispersion. The resultant dispersion was uniformly agitated to provide a first adhesive liquid.

and further mixed with 37.5 kg of an aqueous natural rubber dispersion prepared from a natural rubber resin liquid from which casein was removed, and having a rubber content of 60%, and 131.3 kg of a vinyl pyridine-styrene-butadiene copolymer rubber latex (trademark: JSR 0652, made by NIHON GOSEIGOMU K.K., concentration: 40%).

The mixture was fully agitated and further mixed with 67.0 kg of an aqueous dispersion of carbon black (trademark: FUJICARBON 203, made by FUJI SHIKISO K.K., concentration: 28%) and 758.3 kg of water, and further agitated, to provide a third adhesive liquid.

Preparation of Material Cord

A material polyester fiber cord was produced by the following procedures.

Epoxy compound-pretreated polyester filament yarns prepared by TEIJIN, oiled with an oiling agent containing a polyglycidylether compound in filament-forming procedure and having a yarn count of 1,111 dtex/250 filaments (1,000 denier/250 filaments) and an intrinsic viscosity of 0.85 determined in o-chlorophenol at a temperature of 20° C. were employed to provide polyester fiber cords.

Three epoxy compound-pretreated polyester filament yarns are paralleled with each other and the paralleled yarn bundle was first twisted with a first twist number of 15 turns/10 cm in the Z direction. The first twisted yarns were set parallel with each other, and the resultant yarn bundle was final-twisted with a final twist number of 9 turns/10 cm in the S direction. A material polyester fiber cord having a thickness of 10,000 dtex (9000 denier) was obtained. The material cord was impregnated with the first adhesive liquid by an immersion method using a tire cord treatment machine (trademark: COMPUTREATER, made by CA LITZLER CO.), and the first adhesive liquid-applied cord was dried at a temperature of 130° C. for 160 seconds and then heat treated at a temperature of 235° C. for 150 seconds while stretching the cord at an elongation of 3.5%. The amount of the first adhesive impregnated in the cord was 1.0% by solid weight based on the weight of the cord.

The first adhesive-treated polyester fiber cord was immersed in the second adhesive liquid and taken up from the liquid. The pick up of the second adhesive liquid applied on the first adhesive-treated cord was 2.0% by dry solid weight based on the weight of the cord.

The first adhesive liquid applied cord was dried at a temperature of 170° C. for 150 seconds while maintaining the cord non-elongated and, then, the dried cord was heat treated at a temperature of 230° C. for 120 second under a relaxing condition under which the cord is allowed to shrink at an shrinkage of 0.5%.

Then, the second adhesive-treated cord was immersed in the third adhesive liquid and taken up from the liquid. The pick up of the third adhesive liquid on the second adhesive-treated cord was 1.5% by dry solid weight based on the weight of the cord.

The third adhesive liquid-applied cord was dried and heat-treated at a temperature of 160° C. for 180 seconds.

A third adhesive-treated polyester cord was obtained in a prepreg condition.

The resultant adhesive-treated cord was subjected to a production of a rubber composite material with natural rubber at a press-vulcanizing temperature of 150° C. for 15 minutes under a pressure of 4,903 kPa (50 kgf/cm$^2$).

The test results are shown in Table 2.

Examples 6 to 9 and Comparative Examples 6 to 9

In each of Examples 6 to 9 and Comparative Examples 6 to 9, an adhesive-treated polyester fiber cord and a rubber composite material containing the cord were produced in accordance with the same procedures as in Example 5, except that in the first adhesive liquid, the solid weight ratio ($E_p/I_{so}$) of the polyepoxide compound ($E_p$) to the blocked polyisocyanate compound ($I_{so}$) was changed to that as shown in Table 2; in the second adhesive liquid, the effective component weight ratio ($RF_r/L$) of the resorcinol-formaldehyde condensation product resin ($RF_r$) to the rubber latex (L) was changed to that as shown in Table 2; and in the third adhesive liquid, the solid weight ratio (RF/G) of the resorcinol-formaldehyde condensation product component (RF) to the rubber component (G) comprising the natural rubber (NR) and the vinyl pyridine-styrene-butadiene copolymer rubber (VpR) and the weight ratio (NR/VpR) of the natural rubber (NR) to the vinyl pyridine-styrene-butadiene copolymer rubber (VpR) was changed to those as shown in Table 2.

The test results are shown in Table 2.

Example 10 and Comparative Examples 10 and 11

In each of Example 10 and Comparative Examples 10 and 11, an adhesive-treated polyester fiber cord and a rubber composite material containing the cord were produced in accordance with the same procedures as in Example 5, with the following exceptions. The material polyepoxide-pretreated polyester fiber cords were replaced by non-pretreated material polyester fiber cords each prepared by such a procedure that three polyester filament yarns having a yarn count of 1,111 dtex/250 filaments (1,000 denier/250 filaments) and an intrinsic viscosity of 0.85, determined in the above-mentioned manner, were set parallel with each other, the parallel yarn bundle was first twisted with a first twist number of 15 turns/10 cm in the Z direction, three first twisted yarns were set parallel with each other, and the parallel yarn bundle was final-twisted with a final twist number of 9 turns/10 cm in the S direction. The material polyester fiber cord had a thickness of 10,000 dtex (9000 denier). Also, in the first adhesive liquid, the solid weight ratio ($E_p/I_{so}$) of the polyepoxide compound ($E_p$) to the blocked polyisocyanate compound ($I_{so}$) was changed to that as shown in Table 2; in the second adhesive liquid, the effective component weight ratio ($RF_r/L$) of the resorcinol-formaldehyde condensation product resin ($RF_r$) to the rubber latex (L) was changed to that as shown in Table 2; and in the third adhesive liquid, the solid weight ratio (RF/G) of the resorcinol-formaldehyde condensation product component (RF) to the rubber component (G) comprising the natural rubber (NR) and the vinyl pyridine-styrene-butadiene copolymer rubber (VpR) and the weight ratio (NR/VpR) of the natural rubber (NR) to the vinyl pyridine-styrene-butadiene copolymer rubber (VpR) was changed to those as shown in Table 2.

The test results are shown in Table 2.

TABLE 2

| | | Item | | | | Cord | | Peeling strength between cord and vulcanized rubber | | |
|---|---|---|---|---|---|---|---|---|---|---|
| | First adhesive liquid | Second adhesive liquid | Third adhesive liquid Ratio | | | Tensile | Peeling strength between cord and non-vulcanized rubber | Before exposing to | After exposing to | Material |
| Example No. | Ratio ($E_p/I_{so}$) | Ratio ($RF_r/L$) | Ratio (RF/G) | Ratio (NR/VpR) | | strength (N) | (N/5 cords) | Handling property | water vapor (N/3 cords) | water vapor (N/3 cords) | Polyester fiber cord |
| Comparative Example 6 | 1/1 | 1/2 | 1/8 | 3/7 | | 670 | 3.5 | 2 | 220 | 10 | Polyepoxide-pretreated |
| 7 | 1/3 | 1/5 | 1/12 | 1/9 | | 680 | 3.0 | 2 | 225 | 85 | |

TABLE 2-continued

| | | Item | | | | Cord | | | | |
|---|---|---|---|---|---|---|---|---|---|---|
| | First adhesive liquid | Second adhesive liquid | Third adhesive liquid Ratio | | Tensile | Peeling strength between cord and non-vulcanized | | Peeling strength between cord and vulcanized rubber | | |
| | | | | | | | | Before exposing to | After exposing to | Material |
| Example No. | Ratio ($E_p/I_{so}$) | Ratio ($RF_r/L$) | Ratio (RF/G) | Ratio (NR/VpR) | strength (N) | rubber (N/5 cords) | Handling property | water vapor (N/3 cords) | water vapor (N/3 cords) | Polyester fiber cord |
| Example 5 | 1/4 | 1/13 | 1/20 | 3/7 | 680 | 5.2 | 2 | 320 | 220 | |
| 6 | 1/3 | 1/5 | 1/12 | 8/2 | 675 | 8.8 | 1 | 310 | 210 | |
| 7 | 1/4 | 1/5 | 1/16 | 3/7 | 685 | 5.8 | 2 | 325 | 245 | |
| 8 | 1/5 | 1/5 | 1/16 | 4/6 | 670 | 6.6 | 2 | 310 | 220 | |
| 9 | 1/4 | 1/12 | 1/18 | 3/7 | 675 | 6.2 | 2 | 320 | 230 | |
| Comparative Example 8 | 1/5 | 1/16 | 1/18 | 3/7 | 670 | 5.8 | 2 | 260 | 50 | |
| Example 9 | 1/6 | 1/5 | 1/21 | 10/0 | 665 | 10.8 | 1 | 170 | 40 | |
| Example 10 | 1/4 | 1/5 | 1/16 | 3/7 | 682 | 5.6 | 2 | 316 | 218 | Non-pretreated |
| Comparative Example 10 | 1/4 | 1/5 | 1/16 | 0/10 | 683 | 2.5 | 2 | 315 | 90 | |
| Example 11 | 1/1 | 1/5 | 1/16 | 3/7 | 680 | 5.2 | 2 | 260 | 168 | |

INDUSTRIAL APPLICABILITY

The process of the present invention enables an adhesive-treated polyester fiber cord, having excellent mechanical properties and a high resistance to separation of the fibers or filaments, in the cord, from each other in a rubber composite material-forming procedure, which separation resistance contributes to enhancing the production efficiency of the rubber composite material, an excellent bonding property to a matrix rubber of the rubber composite material, to be produced. Also, the adhesive-treated polyester fiber cord produced by the process of the present invention is useful as a reinforcing cord for rubber composite materials, for example, belts, having a high dimensional stability, an excellent power-transmission property and a superior resistance to fatigue.

What is claimed is:

1. A process for producing an adhesive-treated polyester fiber cord comprising:

subjecting a non-twisted or twisted polyester fiber cord to a first adhesive-treating procedure in which a first adhesive liquid comprising a polyepoxide compound and a blocked polyisocyanate compound in a solid weight ratio of 1/3 to 1/5 is applied to the polyester fiber cord and the first adhesive liquid-applied polyester fiber cord is heat treated at a temperature of 160 to 240° C.;

twisting, where the polyester fiber cord has no twist, the non-twisted polyester fiber cord;

subjecting the first adhesive-treated polyester fiber cord to a second adhesive-treating procedure in which a second adhesive liquid comprising a resorcinol-formaldehyde condensation product resin and a rubber latex in an effective component weight ratio of 1/3 to 1/15, is applied to the first adhesive-treated polyester fiber cord, and the second adhesive liquid-applied polyester fiber cord is heat-treated at a temperature of 180 to 240° C.; and subjecting the second adhesive-treated polyester fiber cord to a third adhesive-treating procedure in which a third adhesive liquid comprising an aqueous dispersion of a resorcinol-formaldehyde condensation product component (RF) in a molar ratio (R/F) of resorcinol (R) to formaldehyde (F) of 1/0.6 to 1/1.0 and a rubber component (G) containing natural rubber (NR) in a content of at least 15% by weight based on the total weight of the rubber component (G), in a solid weight ratio (RF/G) of the resorcinol-formaldehyde condensation product component (RF) to the rubber component (G) of 1/10 to 1/20, is applied to the second adhesive-treated polyester fiber cord, and the third adhesive liquid-applied polyester fiber cord is heat-treated at a temperature of 140 to 170° C.

2. The process for producing an adhesive-treated polyester fiber cord as claimed in claim 1, wherein the polyester fibers in the polyester fiber cord are fibers treated with an epoxy compound during a fiber-forming procedure.

3. The process for producing an adhesive-treated polyester fiber cord as claimed in claim 1, wherein the polyepoxide compound contained in the first adhesive liquid is selected from glycidyl ether compounds of polyhydric alcohol compounds.

4. The process for producing an adhesive-treated polyester fiber cord as claimed in claim 1, wherein the polyepoxide compound in the first adhesive liquid has a epoxy group content of 0.2 equivalent or more per 100 g of the polyepoxide compound.

5. The process for producing an adhesive-treated polyester fiber cord as claimed in claim 1, wherein the blocked polyisocyanate compound is selected from addition reaction products of a polyisocyanate compound with a blocking agent comprising at least one member selected from oxime compounds, phenol compounds and caprolactam.

6. The process for producing an adhesive-treated polyester fiber cord as claimed in any of claim 1 and 3 to 5, wherein the first adhesive-treated polyester fiber cord has the first adhesive in a total solid weight of 0.5 to 1.5% by weight based on the polyester fiber cord.

7. The process for producing an adhesive-treated polyester fiber cord as claimed in claim 1, wherein the heat treatment for the first adhesive liquid-applied polyester fiber cord is carried out under a stretched condition under which the first adhesive liquid-applied polyester fiber cord is elongated at an elongation of 2.0 to 4.5%.

8. The process for producing an adhesive-treated polyester fiber cord as claimed in claim 1, wherein the rubber latex contained in the second adhesive liquid comprises, as a main rubber component, a vinylpyridine-styrene-butadiene copolymer rubber.

9. The process for producing an adhesive-treated polyester fiber cord as claimed in claim 1, wherein the second adhesive liquid further comprises a blocked isocyanate compound in a weight ratio of 1/10 to 1/3 to the solid weight of the rubber latex contained in the second adhesive liquid.

10. The process for producing an adhesive-treated polyester fiber cord as claimed in any of claim 1, 8 and 9, wherein the second adhesive-treated polyester fiber cord has the second adhesive in a total solid weight of 2.0 to 3.0% based on the weight of the polyester fiber cord.

11. The process for producing an adhesive-treated polyester fiber cord as claimed in claim 1, wherein the heat treatment for the second adhesive liquid-applied polyester fiber cord is carried out under a relaxed condition under which the second adhesive liquid-applied polyester fiber cord is allowed to shrink at a shrinkage of 0.5 to 1.5%.

12. The process for producing an adhesive-treated polyester fiber cord as claimed in claim 1, wherein the rubber component (G) contained in the third adhesive liquid comprises natural rubber (NR) and a vinylpyridine-styrene-butadiene copolymer rubber (VpR) in a solid weight ratio (NR/VpR) of 2/8 to 4/6.

13. The process for producing an adhesive-treated polyester fiber cord as claimed in claim 1, wherein the third adhesive liquid further comprises an aqueous dispersion of carbon black (C) in an effective component weight ratio (C/(RF+G)) of the carbon black to the total of the resorcinol-formaldehyde condensation product component (RF) and the rubber component (G) of 1/3 to 1/10.

14. The process for producing an adhesive-treated polyester fiber cord as claimed in any of claims 1, 12 and 13, wherein the third adhesive-treated polyester fiber cord has the third adhesive in a total solid weight of 0.5 to 1.5% based on the weight of the polyester fiber cord.

* * * * *